(12) United States Patent
Zmeskal et al.

(10) Patent No.: US 11,506,074 B1
(45) Date of Patent: Nov. 22, 2022

(54) TURBOCHARGER HAVING VARIABLE-VANE TURBINE NOZZLE INCLUDING ARRANGEMENT FOR LOCKING THE VANES IN FULLY OPEN POSITION

(71) Applicant: Garrett Transportation I Inc., Torrance, CA (US)

(72) Inventors: Martin Zmeskal, Brno (CZ); Aurelien Tingaud, Vosges (FR); Jan Musil, Brno (CZ); Filip Letal, Brno (CZ)

(73) Assignee: Garrett Transportation I Inc., Torrance, CA (US)

( * ) Notice: Subject to any disclaimer, the term of this patent is extended or adjusted under 35 U.S.C. 154(b) by 0 days.

(21) Appl. No.: 17/457,038

(22) Filed: Dec. 1, 2021

(51) Int. Cl.
*F01D 17/16* (2006.01)
*F02B 37/22* (2006.01)

(52) U.S. Cl.
CPC .............. *F01D 17/16* (2013.01); *F02B 37/22* (2013.01); *F05D 2220/40* (2013.01); *F05D 2240/12* (2013.01); *F05D 2260/60* (2013.01)

(58) Field of Classification Search
CPC ...... F01D 17/16; F02B 37/22; F05D 2220/40; F05D 2240/12; F05D 2260/60
USPC ......................................................... 415/159
See application file for complete search history.

(56) References Cited

FOREIGN PATENT DOCUMENTS

DE 102015217438 A1 * 3/2017 .............. F02B 37/24
DE 102016203025 A1 * 8/2017 .............. F01D 17/16

* cited by examiner

*Primary Examiner* — J. Todd Newton
(74) *Attorney, Agent, or Firm* — John C. James

(57) ABSTRACT

A variable-nozzle turbocharger includes a variable-vane mechanism that has an annular nozzle ring supporting an array of rotatable vanes connected to vane arms whose distal ends engage recesses in the radially inner periphery of a rotatable unison ring. Rotation of the unison ring causes the vane arms to pivot about their respective pivot axes at the proximal ends of the arms. The vanes are locked in their fully open position by a locking arrangement that includes locking tongues that extend radially inwardly from the inner periphery of the unison ring and contact the vane arms intermediate their distal and proximal ends.

4 Claims, 6 Drawing Sheets

US 11,506,074 B1

TURBOCHARGER HAVING VARIABLE-VANE TURBINE NOZZLE INCLUDING ARRANGEMENT FOR LOCKING THE VANES IN FULLY OPEN POSITION

BACKGROUND OF THE INVENTION

The present invention relates to turbochargers having a variable-nozzle turbine in which an array of movable vanes is disposed in the nozzle of the turbine for regulating exhaust gas flow into the turbine.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. Typically the turbine housing is formed separately from the compressor housing, and there is yet another center housing connected between the turbine and compressor housings for containing bearings for the shaft. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

One of the challenges in boosting engine performance with a turbocharger is achieving a desired amount of engine power output throughout the entire operating range of the engine. It has been found that this objective is often not readily attainable with a fixed-geometry turbocharger, and hence variable-geometry turbochargers have been developed with the objective of providing a greater degree of control over the amount of boost provided by the turbocharger.

One type of variable-geometry turbocharger is the variable-nozzle turbocharger (VNT), which includes an array of variable vanes in the turbine nozzle. The vanes are rotatably mounted to a nozzle ring, which forms one wall of the nozzle. The opposite wall of the nozzle is formed by an insert that fits into a space defined in the turbine housing. The axial spacing between the nozzle ring and the insert is maintained by several spacers that are connected between these parts. The vanes are connected to a mechanism that enables the setting angles of the vanes to be varied. Changing the setting angles of the vanes has the effect of changing the effective flow area in the turbine nozzle, and thus the flow of exhaust gas to the turbine wheel can be regulated by controlling the vane positions. In this manner, the power output of the turbine can be regulated, which allows engine power output to be controlled to a greater extent than is generally possible with a fixed-geometry turbocharger.

The present disclosure is directed toward improvements in variable-nozzle turbines of the type noted above.

BRIEF SUMMARY OF THE DISCLOSURE

The present disclosure describes a variable-nozzle turbocharger having a variable-vane assembly for regulating exhaust gas flow to the turbine wheel. In one embodiment described herein, the turbocharger comprises:

a turbine assembly comprising a turbine housing and a turbine wheel mounted in the turbine housing and connected to a rotatable shaft for rotation therewith, the turbine housing defining a chamber surrounding the turbine wheel for receiving exhaust gas and for supplying the exhaust gas to the turbine wheel, the turbine assembly defining a nozzle leading from the chamber generally radially inwardly to the turbine wheel;

a compressor assembly comprising a compressor housing and a compressor wheel mounted in the compressor housing and connected to the rotatable shaft for rotation therewith;

a center housing connected between the compressor housing and the turbine housing;

a variable-vane assembly comprising a generally annular nozzle ring and an array of vanes circumferentially spaced about the nozzle ring adjacent a first face thereof, and a unison ring that is rotatable about a central axis of the variable-vane assembly, the unison ring defining a plurality of recesses in a radially inner periphery of the unison ring, the vanes being disposed in the nozzle such that exhaust gas flows between the vanes to the turbine wheel, wherein each vane is joined to an axle that passes through a bearing aperture in the nozzle ring, wherein an end of each axle projects out from the bearing aperture at a second face of the nozzle ring opposite from said first face and is joined to a vane arm at a proximal end of the vane arm, wherein the vane arms have distal ends that are received respectively into the recesses in the radially inner periphery of the unison ring such that rotation of the unison ring about the central axis causes the vane arms to pivot the axles and thereby rotate the vanes between a fully open position and a fully closed position and intermediate positions therebetween for regulating exhaust gas flow to the turbine wheel; and a locking arrangement for locking the vanes in the fully open position, the locking arrangement comprising a plurality of locking tongues extending radially inwardly from the radially inner periphery of the unison ring, each said locking tongue being adjacent a respective one of the recesses in the radially inner periphery and being positioned to contact a respective one of the vane arms at a location intermediate the distal end and the proximal end of the vane arm in the fully open position.

In accordance with one embodiment, each recess in the unison ring comprises a vane-opening wall proximate the respective locking tongue and a vane-closing wall opposite the vane-opening wall. The distal end of each vane arm is disposed between the vane-opening wall and the vane-closing wall. Each vane arm in the fully open position is constrained by a first constraint point comprising the proximal end of the vane arm joined to the respective vane axle, by a second constraint point comprising the respective locking tongue engaged with the vane arm intermediate the proximal and distal ends of the vane arm, and by a third constraint point comprising the distal end of the vane arm engaged with the vane-closing wall of the respective recess in the unison ring.

In one embodiment, the variable-vane assembly can further comprise a plurality of guides affixed to the nozzle ring and in engagement with the radially inner periphery of the unison ring for guiding rotational movement of the unison ring. Engagement of the locking tongues with the guides can define the fully closed position of the vanes.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE DRAWINGS

The present inventions now will be described more fully hereinafter with reference to the accompanying drawings, in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
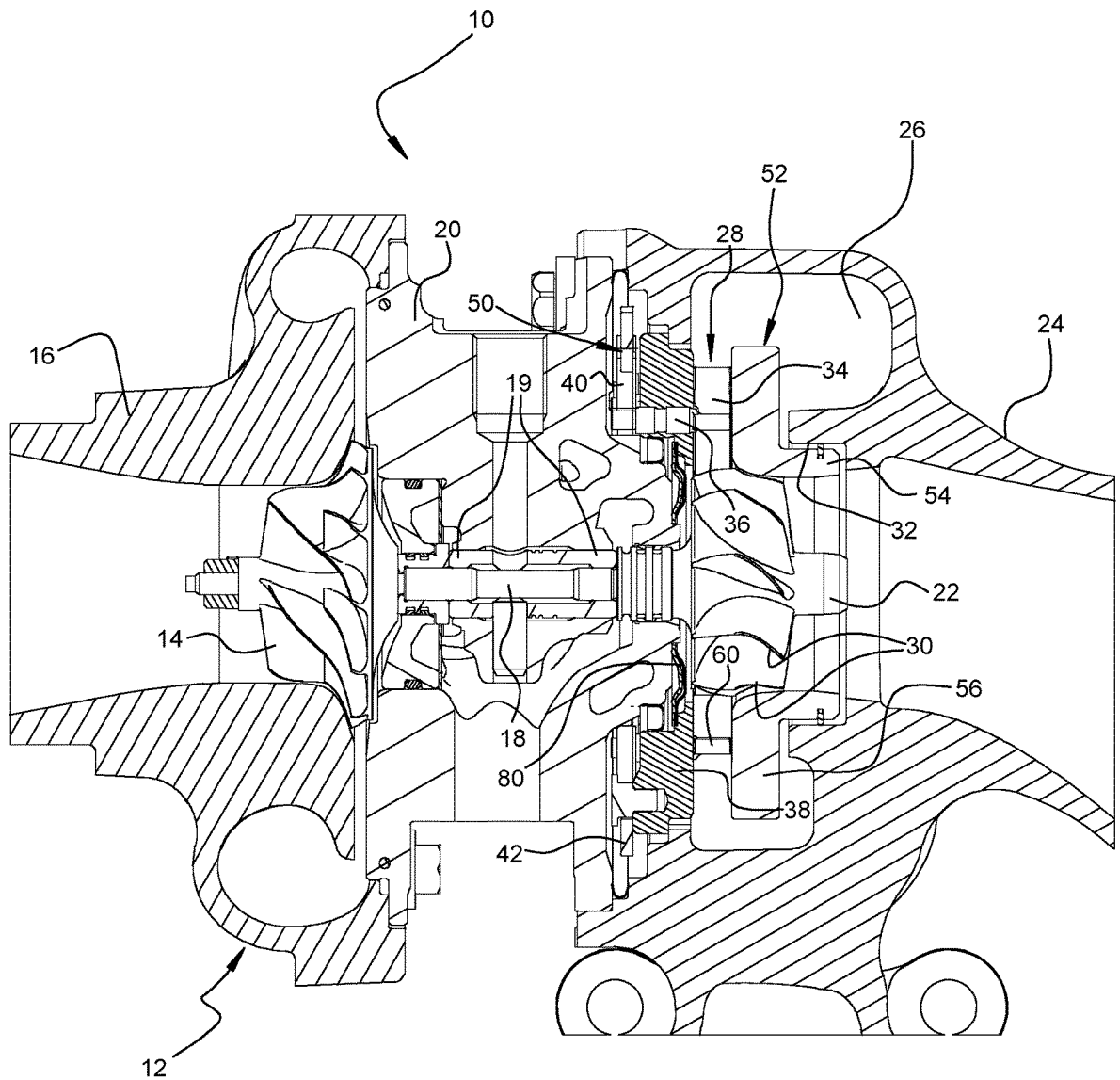
FIG. 1 is a cross-sectional view of a turbocharger in accordance with one embodiment of the invention.

A turbocharger 10 in accordance with one embodiment of the invention is illustrated in cross-sectional view in FIG. 1. The turbocharger comprises a compressor 12 having a compressor wheel or impeller 14 mounted in a compressor housing 16 on one end of a rotatable shaft 18. The shaft is supported in bearings 19 mounted in a center housing 20 of the turbocharger. The shaft 18 is rotated by a turbine wheel 22 mounted on the other end of the shaft 18 from the compressor wheel, thereby rotatably driving the compressor wheel, which compresses air drawn in through the compressor inlet and delivers the compressed air to the intake of an internal combustion engine (not shown) for boosting the performance of the engine.

The turbocharger also includes a turbine housing 24 that houses the turbine wheel 22. The turbine housing defines a generally annular chamber 26 that surrounds the turbine wheel and that receives exhaust gas from the internal combustion engine for driving the turbine wheel. The exhaust gas is directed from the chamber 26 generally radially inwardly through a turbine nozzle 28 to the turbine wheel 22. As the exhaust gas flow through the passages between the blades 30 of the turbine wheel, the gas is expanded to a lower pressure, and the gas discharged from the wheel exits the turbine housing through a generally axial bore 32 therein.

Reference is now made to FIGS. 2 through 7, which depict a subassembly of the turbocharger, comprising a variable-vane assembly for the turbine nozzle 28 for varying the cross-sectional flow area through the nozzle so as to regulate flow into the turbine wheel. The assembly includes a plurality of vanes 34 that are circumferentially spaced about the nozzle. Each vane is affixed to an axle 36 that passes through a bearing aperture in a generally annular nozzle ring 38 that is mounted coaxially with respect to the turbine wheel 22. Each axle 36 is rotatable about its axis for rotating the attached vane. The nozzle ring 38 forms one wall of the flow passage of the nozzle 28. Each of the axles 36 has a vane arm 40 affixed to an end of the axle that protrudes out from the nozzle ring 38. Distal ends 41 of the vane arms 40 are engaged in generally U-shaped recesses 43 defined in the radially inner periphery of an annular unison ring 42 (also referred to as an actuator ring) that is rotatable about its axis and that is coaxial with the nozzle ring 38. Guides 39 mounted on the nozzle ring 38 are engaged with the inner periphery of the unison ring for guiding its rotational movement so that it remains substantially concentric with the nozzle ring, and for preventing the unison ring from moving in the axial direction away from the nozzle ring. An actuator (not shown) is connected to the unison ring 42 for rotating it about its axis. When the unison ring is rotated, the vane arms 40 are rotated to cause the axles 36 to rotate about their axes, thereby rotating the vanes 34 so as to vary the cross-sectional flow area through the nozzle 28.

In the illustrated embodiment, the variable vane mechanism is provided in the form of a unit or cartridge 50 (FIG. 1) that is installable into and removable from the turbocharger. The unit 50 comprises the nozzle ring 38, vanes 34, axles 36, vane arms 40, and unison ring 42. The unit works in cooperation with an insert 52 having a tubular portion 54 received into the axial bore 32 of the turbine housing 24. The insert defines a nozzle portion 56 that extends radially outwardly from the tubular portion and is axially spaced from the nozzle ring 38 such that the vanes 34 extend between the nozzle ring 38 and the nozzle portion 56.

The turbocharger includes a heat shroud 80 (FIG. 1) that is captively retained between the nozzle ring 38 and the center housing 20 when the variable-vane unit 50 is installed into the turbocharger. The heat shroud 80 provides sealing between the nozzle ring and center housing to prevent hot exhaust gas from migrating between these parts into the cavity in which the vane arms 40 and unison ring 42 are disposed. The heat shroud 80 advantageously is a resiliently elastic material such as spring steel or the like, and the shroud is configured so that it is compressed in the axial direction between the nozzle ring 38 and the center housing 20 so that the restoring force of the shroud urges the nozzle ring 38 axially toward the turbine wheel 22 (to the right in FIG. 1).

A plurality of spacers 60 are mounted to the nozzle ring 38 and project toward the nozzle portion 56 of the insert 52. Ends of the spacers 60 abut the nozzle portion 56 (as urged by the resilient heat shroud 80 described in the preceding paragraph) for maintaining the desired axial spacing between the nozzle portion 56 of the insert and the nozzle ring 38. The spacers thereby help ensure that there are small axial clearances between the ends of the vanes 34 and the nozzle ring 38 on one end and the nozzle portion 56 on the other end. The axial spacing set by the spacers 60 is designed to ensure that those clearance do not become too small, which could cause binding of the vanes, or too large, which could compromise turbine efficiency.

Figure 2:
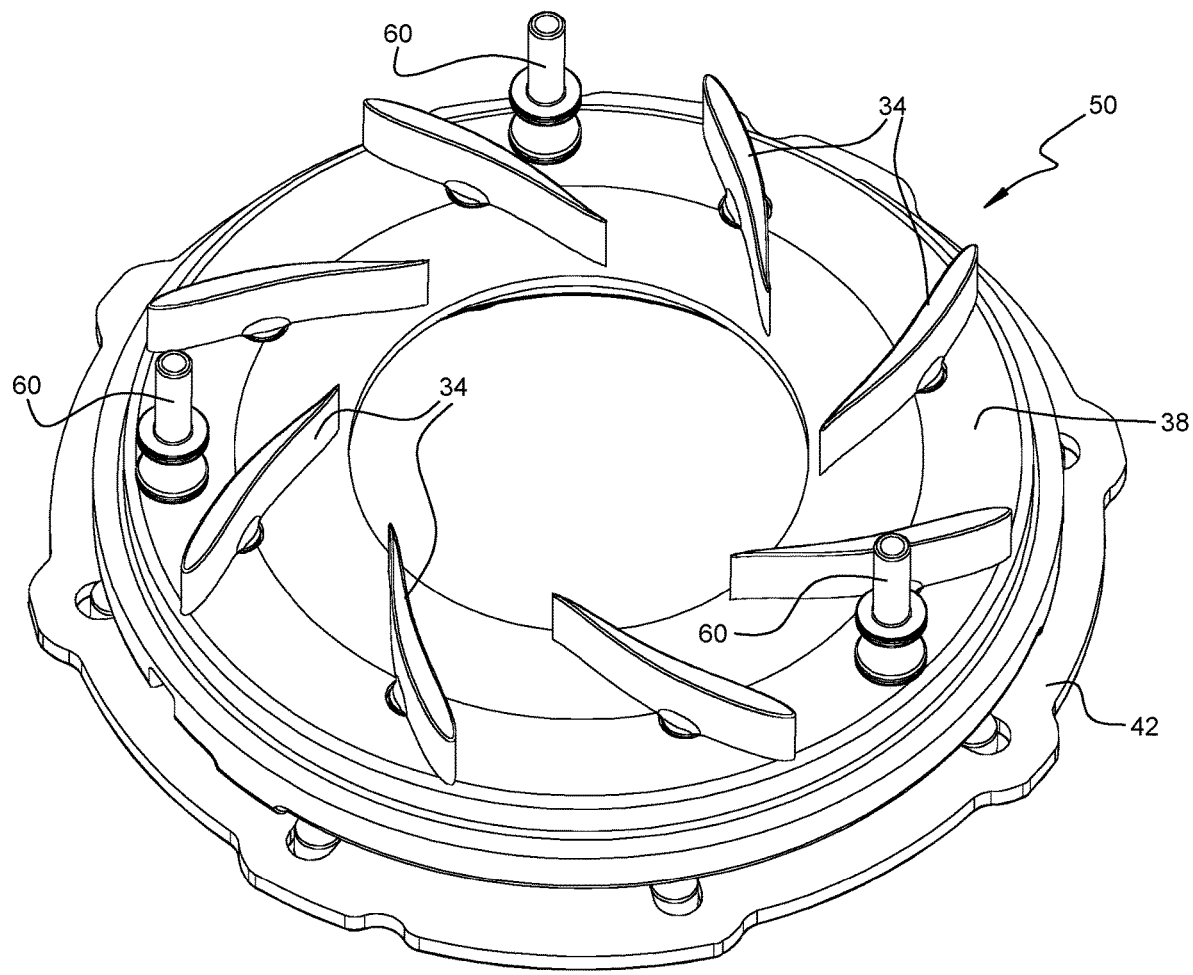
FIG. 2 is an isometric view of a variable-vane assembly for the turbocharger in accordance with one embodiment of the invention, viewed from a vane side of the assembly, the variable-vane assembly being shown with the vanes in a fully open position.
Figure 3:
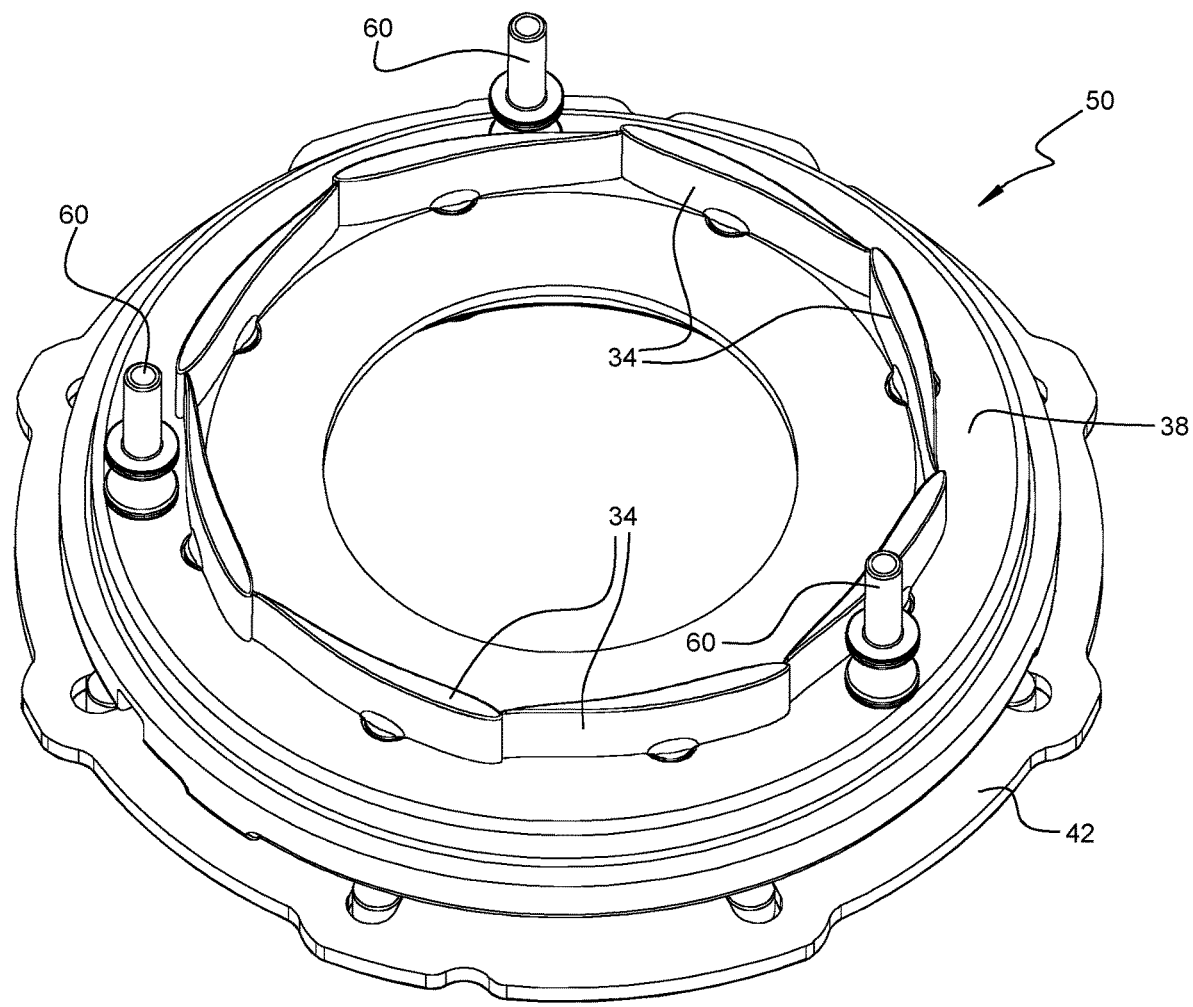
FIG. 3 is an isometric view similar to FIG. 2, but with the vanes in a fully closed position.
Figure 4:
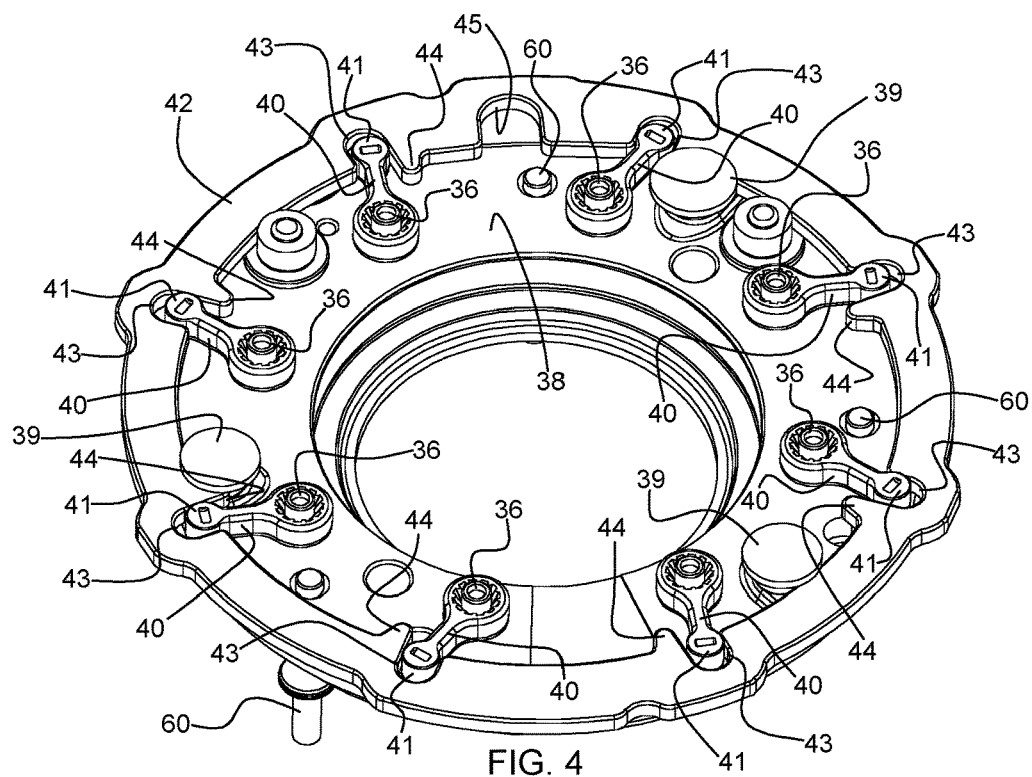
FIG. 4 is an isometric view of the fully closed variable-vane assembly of FIG. 2, viewed from an opposite vane arm side of the assembly.
Figure 5:
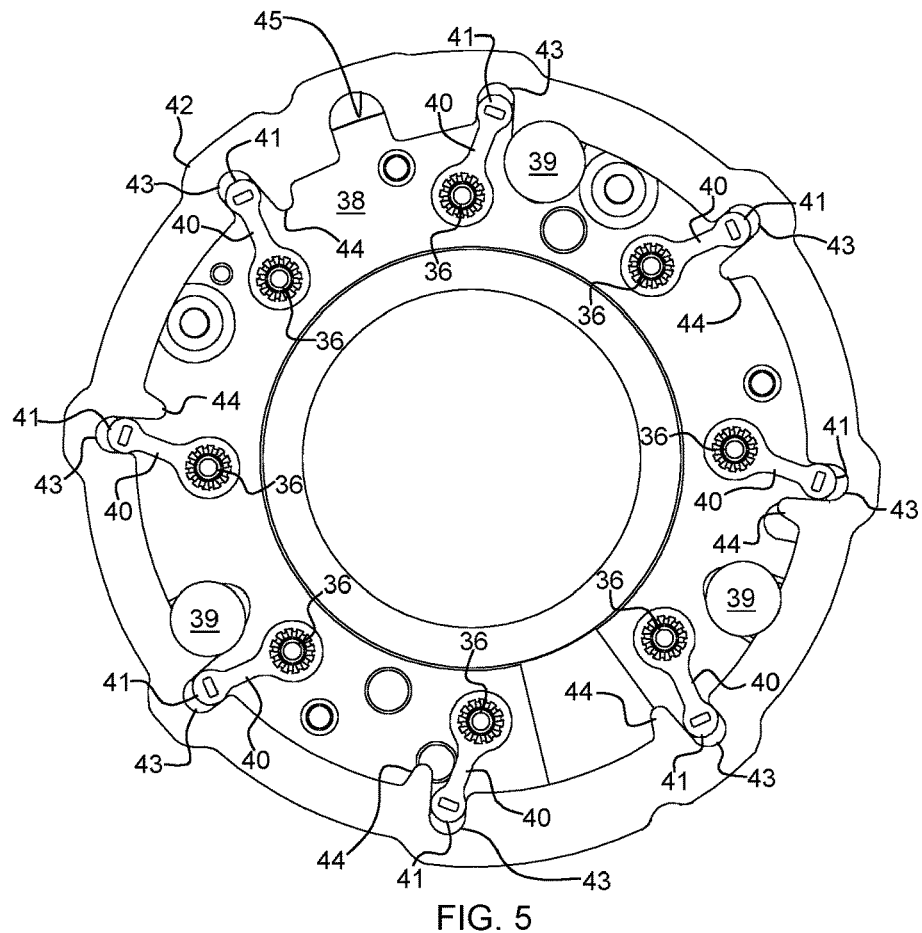
FIG. 5 is a plan view of the fully closed variable-vane assembly of FIG. 4.
Figure 6:
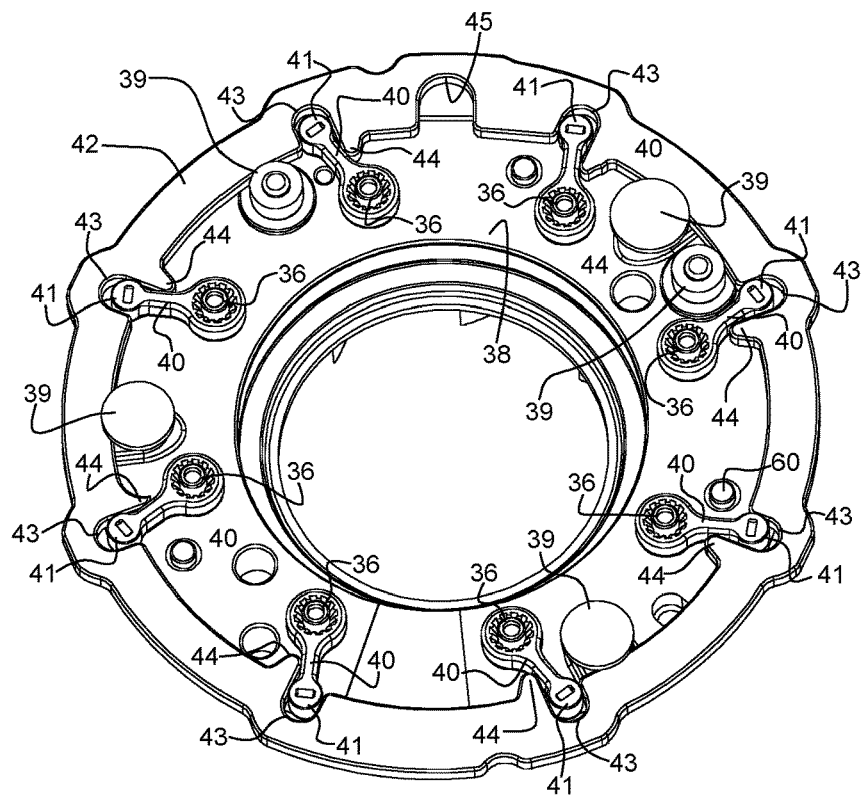
FIG. 6 is an isometric view of the fully open variable-vane assembly, viewed from the vane arm side of the assembly.
Figure 7:
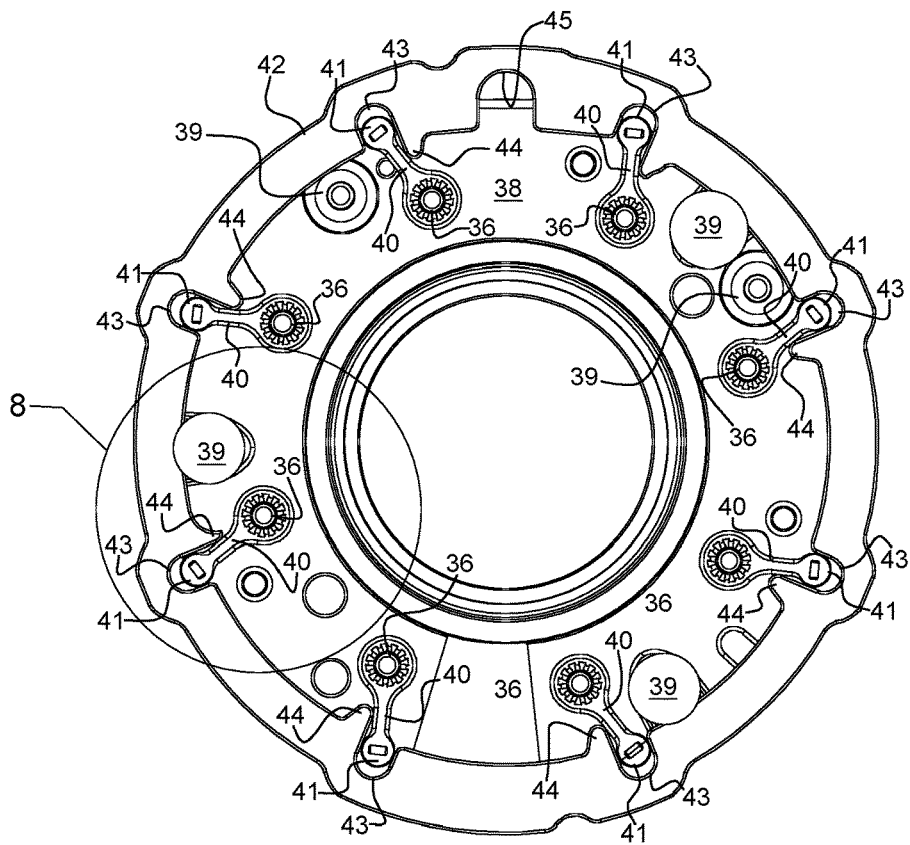
FIG. 7 is a plan view of the fully open variable-vane assembly, viewed from the vane arm side of the assembly.

FIG. 2 shows the vane side of the variable-vane assembly, with the vanes 34 in their fully open position, whereas FIG. 3 shows the vanes in their fully closed position. FIGS. 4 and 5 show the vane arm side of the assembly in the fully closed position, while FIGS. 6 and 7 show the vane arm side of the assembly in the fully open position. With particular reference to FIGS. 4-7, the unison ring 42 includes an actuator notch 45 for receiving an end of a crank (not shown) that is part of a kinematic chain between an actuator (not shown) and the unison ring. The crank is rotated by the actuator so as to impart rotational movement to the unison ring in a clockwise direction in FIGS. 4-7 to move the vanes toward their closed position, or in a counterclockwise direction to move the vanes toward their open position. As shown in FIGS. 4 and 5, the unison ring has been rotated clockwise to the fully closed position. The recesses 43 in the ring's inner periphery therefore have driven the distal ends 41 of the vane arms 40 to cause the vane axles 36 to rotate clockwise and place the vanes in their fully closed position. Conversely, FIGS. 6 and 7 depict the unison ring having been rotated counterclockwise to the fully open position, thereby imparting counterclockwise rotation to the vane axles so that the vanes are placed in their fully open position.

In accordance with the invention, the unison ring 40 defines a plurality of locking tongues 44 that extend radially inwardly from the radially inner periphery of the ring. Each locking tongue is located proximate one of the recesses 43 and is on the vane-opening side of the recess. More particularly, with reference to FIG. 8, which shows a single vane arm and the associated portion of the unison ring, each recess 43 in the unison ring has a vane-opening wall 43o and an opposite vane-closing wall 43c, and the distal end 41 of the vane arm 40 is disposed these two walls. The vane-opening wall 43o is the wall that exerts force on the distal end 41 of the vane arm in one direction to cause the vane arm to rotate its vane toward the open position, and the vane-closing wall 43c is the wall that exerts force on the distal end of the arm in the opposite direction to cause the arm to rotate the vane toward the closed position. The locking tongue 44 is proximate the vane-opening wall 43o as best seen in FIG. 8.

The invention addresses an issue with the variable-vane assembly relating to vibrations induced in the assembly by the internal combustion engine to which the turbocharger is coupled. The vibrations tend to cause a degree of relative vibratory motion between the vane arms and the unison ring recesses, as well as between the vane axles and the nozzle ring, that can induce excessive wear of the recesses and/or the vane arm ends and/or the vane axles and/or the nozzle ring. Such wear points can lead in some cases to the vanes becoming stuck in one position and/or contribute to poor regulation of the variable-vane assembly. The invention aims to mitigate the amount of engine vibration-induced wear within the variable-vane assembly.

Figure 8:
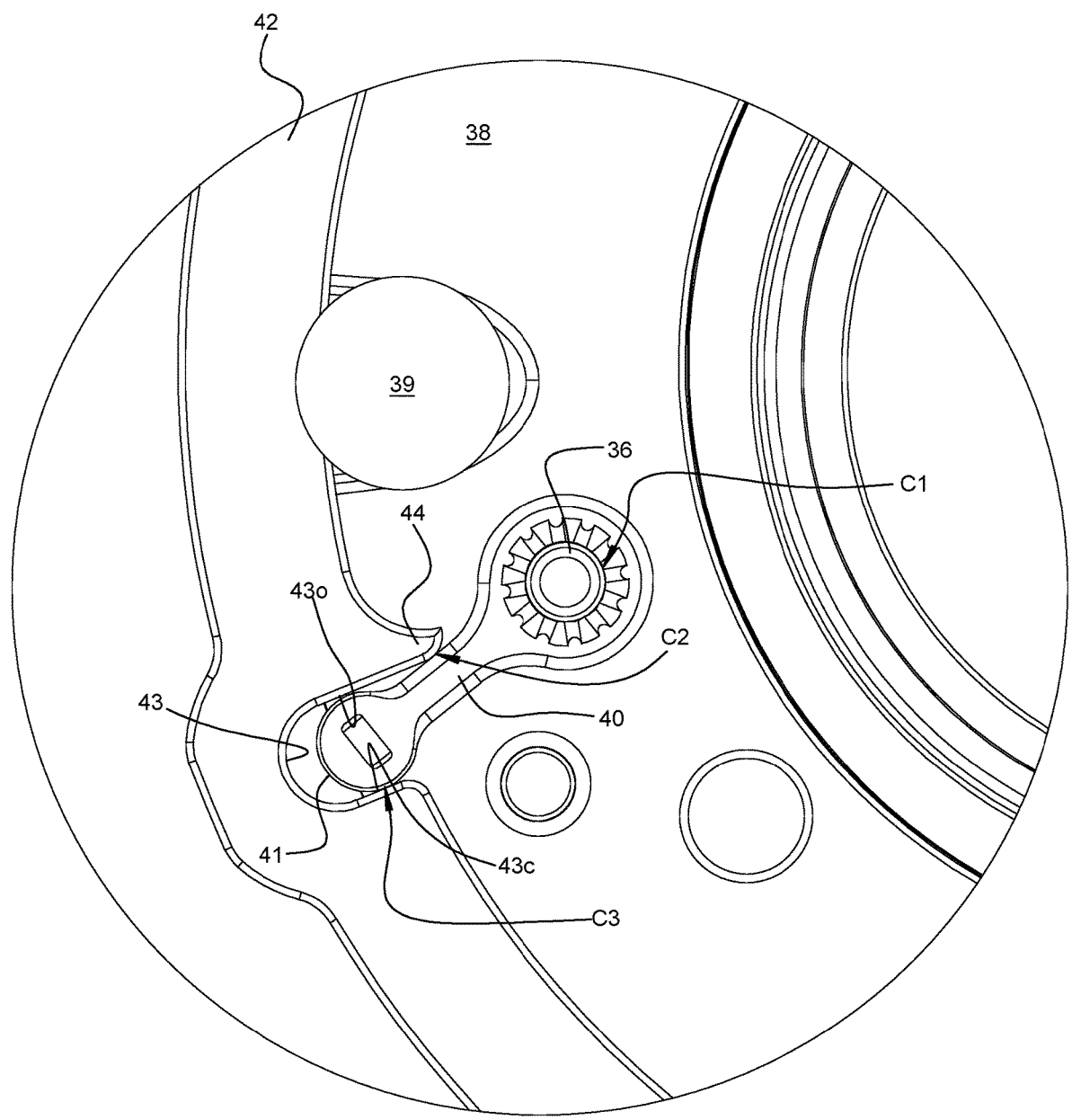
FIG. 8 is a magnified portion of FIG. 7, showing a locking tongue engaged with the corresponding vane arm in the fully open position of the vane.

To this end, the locking tongues 44 are structured and arranged to provide constraint to the vane arms 40 when the variable-vane assembly is in the fully open position as best seen in FIG. 8. Such constraint is created by the locking tongues contacting the shanks of the vane arms at a location intermediate the two opposite ends of each vane arm. This results in a three-point constraint of the arm. A first constraint point C1 is the attachment of the proximal end of the vane arm to the vane axle 36 and an associated contact point between the vane axle and the inner surface of the bearing aperture in the nozzle ring. A second constraint point is formed by the contact between the locking tongue 44 and the shank of the vane arm. A third constraint point C3 occurs between the vane arm distal end 41 and the vane-closing wall 43c of the unison ring recess 43. This three-point constraint essentially "locks" the vane arm in the fully open position, and indeed the constraint provided by the locking tongue actually defines the fully open position, such that no additional mechanism stop is needed. Optionally, in some embodiments the locking tongues can serve a further function of defining the fully closed position of the vanes by virtue of at least one of the locking tongues coming into contact with at least one of the unison ring guides 39 as best seen in FIG. 4. In such embodiments, the invention thus has the added benefit of reducing parts count and assembly steps.

The locking action of the locking tongues substantially reduces the free play of the vane arm distal ends within the unison ring recesses. Accordingly, engine vibration-induced movements of the vane arms will result in impact forces between these components of a reduced magnitude relative to a conventional variable-vane assembly lacking the locking tongues of the present invention. While the locking action is effective only in the fully open vane position, it is still effective at reducing wear in view of the fact that the turbocharger spends a substantial fraction of its operating life at vehicle cruising conditions in which the vanes are fully open. It should be noted that for the locking tongues to be effective at reducing the vane arm movements, the actuator must continuously exert force on the unison ring toward the fully open position. Anti-back-drive action of the actuator kinematic chain is not sufficient to prevent engine vibrations from causing the vanes to be moved away from the fully open position, which would substantially eliminate the advantage provided by the locking tongues.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbocharger having a variable-nozzle turbine, comprising:
   a turbine assembly comprising a turbine housing and a turbine wheel mounted in the turbine housing and connected to a rotatable shaft for rotation therewith, the turbine housing defining a chamber surrounding the turbine wheel for receiving exhaust gas and for supplying the exhaust gas to the turbine wheel, the turbine assembly defining a nozzle leading from the chamber generally radially inwardly to the turbine wheel;
   a compressor assembly comprising a compressor housing and a compressor wheel mounted in the compressor housing and connected to the rotatable shaft for rotation therewith;
   a variable-vane assembly comprising a generally annular nozzle ring and an array of vanes circumferentially spaced about the nozzle ring adjacent a first face thereof, and a unison ring that is rotatable about a central axis of the variable-vane assembly, the unison ring defining a plurality of recesses in a radially inner periphery of the unison ring, the vanes being disposed in the nozzle such that exhaust gas flows between the vanes to the turbine wheel, wherein each vane is joined to an axle that passes through a bearing aperture in the nozzle ring, wherein an end of each axle projects out from the bearing aperture at a second face of the nozzle ring opposite from said first face and is joined to a vane arm at a proximal end of the vane arm, wherein the vane arms have distal ends that are received respectively into the recesses in the radially inner periphery of the unison ring such that rotation of the unison ring about the central axis causes the vane arms to pivot the axles and thereby rotate the vanes between a fully open position and a fully closed position and intermediate positions therebetween for regulating exhaust gas flow to the turbine wheel; and a locking arrangement for locking the vanes in the fully open position, the locking arrangement comprising a plurality of locking tongues extending radially inwardly from the radially inner periphery of the unison ring, each said locking tongue being adjacent a respective one of the recesses in the radially inner periphery and being positioned to contact a respective one of the vane arms at a location intermediate the distal end and the proximal end of the vane arm in the fully open position.

2. The turbocharger of claim 1, wherein each recess in the unison ring comprises a vane-opening wall proximate the respective locking tongue and a vane-closing wall opposite the vane-opening wall, the distal end of each vane arm being disposed between the vane-opening wall and the vane-closing wall, and wherein each vane arm in the fully open position is constrained by a first constraint point comprising the proximal end of the vane arm joined to the respective vane axle, by a second constraint point comprising the respective locking tongue engaged with the vane arm intermediate the proximal and distal ends of the vane arm, and by a third constraint point comprising the distal end of the vane arm engaged with the vane-closing wall of the respective recess in the unison ring.

3. The turbocharger of claim 1, wherein engagement of the locking tongues with the vane arms defines the fully open position of the vanes, the variable-vane assembly being free of additional stop mechanisms for defining the fully open position.

4. The turbocharger of claim 3, wherein the variable-vane assembly further comprises a plurality of guides affixed to the nozzle ring and in engagement with the radially inner periphery of the unison ring for guiding rotational movement of the unison ring, and wherein engagement of at least one of the locking tongues with at least one of the guides defines the fully closed position of the vanes.

* * * * *